(12) United States Patent
Planeta et al.

(10) Patent No.: US 12,466,948 B2
(45) Date of Patent: Nov. 11, 2025

(54) ULTRA-FAST MARINE-BIODEGRADABLE COMPOSITE FILM

(71) Applicant: Singular Solutions Inc., North York (CA)

(72) Inventors: Mirek Planeta, Mississauga (CA); Alex Mann, Vaughan (CA); Vladimir Climov, Toronto (CA)

(73) Assignee: SINGULAR SOLUTIONS INC., North York (CA)

( * ) Notice: Subject to any disclaimer, the term of this patent is extended or adjusted under 35 U.S.C. 154(b) by 269 days.

(21) Appl. No.: 18/026,354

(22) PCT Filed: Sep. 17, 2021

(86) PCT No.: PCT/CA2021/051302
§ 371 (c)(1),
(2) Date: Mar. 15, 2023

(87) PCT Pub. No.: WO2022/056641
PCT Pub. Date: Mar. 24, 2022

(65) Prior Publication Data
US 2023/0357565 A1    Nov. 9, 2023

Related U.S. Application Data

(60) Provisional application No. 63/079,673, filed on Sep. 17, 2020.

(51) Int. Cl.
*B32B 7/12* (2006.01)
*B32B 27/08* (2006.01)
(Continued)

(52) U.S. Cl.
CPC ............... *C08L 67/04* (2013.01); *B32B 7/12* (2013.01); *B32B 27/08* (2013.01); *B32B 27/18* (2013.01);
(Continued)

(58) Field of Classification Search
CPC ............ B32B 2250/05; B32B 2250/42; B32B 2264/06; B32B 2264/104;
(Continued)

(56) References Cited

U.S. PATENT DOCUMENTS 4,620,999 A    11/1986  Holmes
5,196,247 A     3/1993  Wu et al.
(Continued)

FOREIGN PATENT DOCUMENTS

CA       2476797 A1    8/2003
CN     104045905 A     9/2014
(Continued)

OTHER PUBLICATIONS

Thellen et al., Melt processing and characterization of polyvinyl alcohol and polyhydroxyalkanoate multilayer films, Journal of Applied Polymer Science, May 2012, pp. 2314-2324, vol. 127, issue 3.

(Continued)

*Primary Examiner* — Lawrence D Ferguson
(74) *Attorney, Agent, or Firm* — Smart & Biggar LP

(57) ABSTRACT

An ultra-fast marine-biodegradable composite film can include at least one water-soluble layer, and at least one marine-biodegradable layer disposed in contact with the at least one water-soluble layer. The composite film can include a plurality of the water-soluble layer, and a plurality of the marine-biodegradable layer interspaced between the marine-biodegradable layers. The composite film may be used for packaging, including food packaging. Methods of preparing an ultra-fast marine-biodegradable composite film are also disclosed.

20 Claims, 3 Drawing Sheets

■ Marine-biodegradable layer
▭ Water-soluble layer
▭ Paper layer

(51) Int. Cl.
  *B32B 27/18* (2006.01)
  *B32B 27/30* (2006.01)
  *B32B 27/36* (2006.01)
  *C08L 67/04* (2006.01)

(52) U.S. Cl.
  CPC ............ *B32B 27/306* (2013.01); *B32B 27/36* (2013.01); *B32B 2250/05* (2013.01); *B32B 2250/42* (2013.01); *B32B 2264/06* (2013.01); *B32B 2264/104* (2013.01); *B32B 2264/302* (2020.08); *B32B 2264/303* (2020.08); *B32B 2307/7163* (2013.01); *B32B 2307/7166* (2013.01); *B32B 2307/7376* (2023.05); *B32B 2439/70* (2013.01)

(58) Field of Classification Search
  CPC ........ B32B 2264/302; B32B 2264/303; B32B 2307/7163; B32B 2307/7166; B32B 2307/7376; B32B 2439/70; B32B 27/08; B32B 27/18; B32B 27/306; B32B 27/36; B32B 7/12; B32B 2262/0223; B32B 2262/0284; B32B 2262/062; B32B 2262/067; B32B 2262/101; B32B 2264/101; B32B 2264/1021; B32B 2264/1027; B32B 2264/1056; B32B 2264/301; B32B 23/04; B32B 2307/732; B32B 27/12; B32B 5/022; B32B 5/024; B32B 9/02; C08L 67/04; C08L 3/02; A61K 2039/55511; A61K 31/437; A61K 31/519; A61K 31/52; A61K 39/00; A61K 39/39; A61P 11/02; A61P 11/06; A61P 29/00; A61P 31/04; A61P 35/00; A61P 37/00; A61P 37/04; A61P 37/08; A61P 43/00; C07B 2200/13; C07D 487/04; Y02W 90/10
  See application file for complete search history.

(56) References Cited

U.S. PATENT DOCUMENTS

| | | | |
|---|---|---|---|
| 5,217,655 A | 6/1993 | Schmidt |
| 5,258,422 A | 11/1993 | Chang et al. |
| 5,281,691 A | 1/1994 | Hubbs et al. |
| 5,391,423 A | 2/1995 | Wnuk et al. |
| 5,626,939 A | 5/1997 | Kotlair et al. |
| 5,844,023 A | 12/1998 | Tomka |
| 5,849,374 A | 12/1998 | Gruber et al. |
| 5,939,467 A | 8/1999 | Wnuk et al. |
| 6,075,118 A | 6/2000 | Wang et al. |
| 6,322,899 B1 | 11/2001 | Karhuketo et al. |
| 7,019,043 B2 | 3/2006 | Maehara |
| 7,077,994 B2 | 7/2006 | Bond et al. |
| 7,098,292 B2 | 8/2006 | Zhao et al. |
| 7,517,937 B2 | 4/2009 | Yano et al. |
| 7,943,218 B2 | 5/2011 | Knoerzer et al. |
| 8,067,485 B2 | 11/2011 | Changping |
| 8,637,126 B2 | 1/2014 | Cleveland et al. |
| 8,993,653 B2 | 3/2015 | Kaya |
| 9,010,338 B2 | 4/2015 | Rustemeyer et al. |
| 9,221,104 B2 | 12/2015 | Moore et al. |
| 9,796,842 B2 | 10/2017 | Wang et al. |
| 9,914,256 B2 | 3/2018 | Tamir |
| 10,239,292 B2 | 3/2019 | Nissenbaum et al. |
| 10,294,666 B2 | 5/2019 | Murdock et al. |
| 10,433,543 B2 | 10/2019 | Bardosh et al. |
| 10,767,026 B2 | 9/2020 | Desrousseaux et al. |
| 10,875,281 B2 | 12/2020 | Przybylinski et al. |
| 2002/0028857 A1 | 3/2002 | Holy |
| 2007/0148384 A1 | 6/2007 | Bowden et al. |
| 2007/0184220 A1 | 8/2007 | Cleveland et al. |
| 2007/0243350 A1 | 10/2007 | Forsberg |
| 2008/0128933 A1 | 6/2008 | Przybylinski et al. |
| 2009/0216207 A1 | 8/2009 | Nielsen |
| 2009/0311455 A1 | 12/2009 | Bastioli |
| 2010/0216909 A1 | 8/2010 | Berg Gebert et al. |
| 2011/0009593 A1 | 1/2011 | Clardy et al. |
| 2011/0200771 A1 | 8/2011 | Barclay |
| 2011/0311743 A1 | 12/2011 | Kaneko |
| 2012/0031543 A1 | 2/2012 | Bacon et al. |
| 2012/0130331 A1 | 5/2012 | Wang et al. |
| 2012/0135169 A1 | 5/2012 | Tangelder et al. |
| 2012/0219790 A1 | 8/2012 | Mount, III et al. |
| 2012/0288693 A1 | 11/2012 | Stanley et al. |
| 2013/0154151 A1 | 6/2013 | Wang |
| 2013/0243912 A1 | 9/2013 | Jensen et al. |
| 2014/0030536 A1 | 1/2014 | Krishnaswamy |
| 2014/0275439 A1 | 9/2014 | Yamano et al. |
| 2014/0329039 A1 | 11/2014 | Neuman et al. |
| 2017/0275070 A1 | 9/2017 | Solomon et al. |
| 2018/0281359 A1 | 10/2018 | Neuman et al. |
| 2018/0334564 A1 | 11/2018 | Andrews et al. |
| 2018/0345637 A1* | 12/2018 | Hackfort ................ B32B 9/045 |
| 2019/0099990 A1 | 4/2019 | Sekido et al. |
| 2019/0152203 A1 | 5/2019 | Nissenbaum et al. |
| 2020/0062646 A1 | 2/2020 | Ng et al. |
| 2020/0410904 A1 | 12/2020 | Tiainen et al. |
| 2021/0309848 A1 | 10/2021 | Planeta et al. |

FOREIGN PATENT DOCUMENTS

| | | |
|---|---|---|
| CN | 105315589 A | 2/2016 |
| CN | 108059804 A | 5/2018 |
| CN | 109651732 A | 4/2019 |
| CN | 110091564 A | 8/2019 |
| EP | 2586821 B1 | 2/2015 |
| EP | 2052030 B1 | 3/2015 |
| EP | 2481771 B1 | 5/2017 |
| FR | 3082143 A1 | 12/2019 |
| JP | 2009241342 A | 10/2009 |
| JP | 2015-39870 A | 3/2015 |
| KR | 20080033620 A | 4/2008 |
| KR | 101165342 B1 | 7/2012 |
| WO | 9627632 A1 | 9/1996 |
| WO | 0132405 A1 | 5/2001 |
| WO | 2004048072 A1 | 6/2004 |
| WO | 2010041063 A2 | 4/2010 |
| WO | 2011108375 A1 | 9/2011 |
| WO | 2019229759 A1 | 12/2019 |
| WO | 2020197419 A1 | 10/2020 |
| WO | 2022/056641 A1 | 3/2022 |

OTHER PUBLICATIONS

Thellen et al., A Processing, Characterization and Marine Biodegradation Study of Melt-Extruded Polyhydroxyalkanoate (PHA) Films, Journal of Polymers and the Environment, Jan. 2008, pp. 1-11, vol. 16, issue 1.

Thellen, High barrier multilayer packaging by the coextrusion method: The effect of nanocomposites and biodegradable polymers on flexible film properties, University of Massachusetts Lowell, ProQuest Dissertations Publishing, Dissertation Abstracts International, vol. 72-03, Section B, p. 101.

Sun et al., Nanofiller Reinforced Biodegradable PLA/PHA Composites: Current Status and Future Trends, Polymers, May 2018, article No. 505, vol. 10, issue 5.

International Search Report and Written Opinion dated Dec. 29, 2021 in respect of PCT/CA2021/051302.

Blackstock, Guide to Biochemistry, 1989, pp. 20-31.

* cited by examiner

ULTRA-FAST MARINE-BIODEGRADABLE COMPOSITE FILM

CROSS-REFERENCE TO RELATED APPLICATIONS

This is a national stage entry of International Application No. PCT/CA2021/051302 filed on Sep. 17, 2021, which claims priority to U.S. Patent Application No. 63/079,673 filed on Sep. 17, 2020, and the entire contents of each are hereby incorporated herein by reference.

FIELD

The present disclosure relates generally to marine-biodegradable, biodegradable and compostable plastics and their structures.

BACKGROUND

The following paragraphs are not an admission that anything discussed in them is prior art or part of the knowledge of persons skilled in the art.

U.S. Pat. No. 5,391,423 describes biodegradable, liquid impervious multilayer film compositions. In particular, the films comprise composite structures derived from multilayer combinations of biodegradable polymers. The biodegradable polymers are selected from the categories of moisture sensitive polymers, thermally sensitive polymers, mechanically limited polymers, polymers not easily processed into films, hydrolytically cleavable polymers, and degradable elastomers. Optionally, the multilayer films may further comprise additional adhesive tie layers. The biodegradable polymers are combined in various ways to overcome the deficiencies of the individual components, yet at the same time impart specific performance properties to the film. The multilayer film compositions are suitable for use as backsheets in disposable absorbent products including diapers, adult incontinent pads, sanitary napkins, pantiliners, and the like.

U.S. Pat. No. 7,077,994 describes films comprising a blend of polyhydroxyalkanoate copolymer and destructured starch. Laminates having a first layer comprising a PHA copolymer and a second layer comprising a PHA copolymer/starch blend or thermoplastic starch are also disclosed. Disposable articles comprising the environmentally degradable films or laminates are also disclosed.

U.S. Pat. No. 10,433,543 describes a multi-layer bioactive and biodegradable film. The multi-layer film includes one or more bioactive compounds or microorganisms for promoting growth and health of a plant, the bioactive compounds or microorganisms contained between layers of the film, wherein each one of the layers comprises about 60% to about 75% (m/m) polyhydroxyalkanoate. The bioactive compounds or microorganisms may include any one of or a combination of: a metabolite, an anti-microbial compound, an enzyme, a live microorganism, a fertilizer, a plant growth hormone, a preservative, a pesticide or an herbicide. Release of one or more bioactive compounds may be achieved in a timed and controlled manner.

INTRODUCTION

The following is intended to introduce the reader to various aspects of the present disclosure, but not to define any invention.

In an aspect of the present disclosure, an ultra-fast marine-biodegradable composite film can include: at least one water-soluble layer; and at least one marine-biodegradable layer disposed in contact with the at least one water-soluble layer.

In an aspect of the present disclosure, a method of producing an ultra-fast marine-biodegradable composite film can include: providing at least one water-soluble layer; providing at least one marine-biodegradable layer; and combining the at least one water-soluble layer and the at least one marine-biodegradable layer to form the composite film.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Figure 1:
FIG. 1 is a schematic diagram of a composite film including marine-biodegradable layers and water-soluble layers.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Plastic-based packaging materials contaminating marine and freshwater present a danger to birds and aquatic animals when birds or aquatic animals get entrapped in such packaging. The use of inherently marine-biodegradable bioplastics have somewhat improved the situation by shortening the time required for such packaging disintegration and loss of its mechanical strength from many years to months. Yet, during those months, the packaging made of inherently marine-biodegradable bioplastics can still present an entrapment danger to birds and aquatic animals.

The present disclosure relates to the discovery that packaging materials having a multilayer structure of intermittent layers of water-soluble and marine-biodegradable substances can disintegrate in marine water into thin separate layers and can lose their mechanical strength by an order of magnitude within 1-2 days only. This discovery opens the way for producing ultra-fast disintegrating packaging materials and single-use disposables that are marine-safe if discarded into marine waters after their use cycle.

Biodegradable plastics (sometimes called bioplastics) can be made either by bacterial fermentation from natural foods (like cornstarch and similar) or synthesized from gas and crude oil byproducts. Such bioplastics include poly(butylene adipate) (PBA), poly(butylene adipate-co-butylene terephthalate) (PBAT), poly(butylene succinate) (PBS), poly(butylene succinate-co-butylene adipate) (PBSA), poly(butylene terephthalate) (PBT), polyhydroxybutyrate (PHB), polyhydroxy-butylhexanoate (PHBH), polydioxanone (PDO), poly (glycolic acid) (PGA), poly(vinyl alcohol) (PVOH), polylactic acid (PLA), poly-epsiloncaprolactone (PCL), poly (limonene carbonate) (PLC), polyhydroxyalkanoate (PHA), polyhydroxyvalerate (PHV), polyhydroxy-butyratevalerate (PHBV), and other biodegradable polymers. These bioplastics are generally distinct from regular plastics because their monomers and the bioplastics themselves are readily edible by bacteria.

It should be appreciated that biodegradable plastics generally are eaten much slower by bacteria in marine water due to multitude of factors including lower temperature, lower content of oxygen, sanitizing effect of salt water, lower light, and lower UV presence. For example, a readily compostable and backyard compostable PBAT, which may completely biodegrade in few months only, biodegrades on marine environment at a very slow rate of 2% per year. Even faster marine degrading polymers like PHBH biodegrades to 25% during 25 days in marine water.

The time duration required for an item to biodegrade depends on its thickness and the overall surface available to contact with the bacteria-containing environment. Thus, thinner items can biodegrade faster than thick ones, and items with a smooth surface can biodegrade slower that similar items with rough surfaces. The entire process of marine biodegradation can be accelerated if the waste item discarded into marine water breaks up into separate layers, thus reducing the thickness of each layer and exposing more surface area to the bacteria-containing environment.

Accordingly, an ultra-fast marine-biodegradable composite film can include: at least one water-soluble layer; and at least one marine-biodegradable layer disposed in contact with the at least one water-soluble layer. Water soluble substances can be selected from TPS, PVOH, and other water soluble plastics or adhesives. The water soluble layers can be interspaced with the marine-biodegradable layers made of substances that can be selected from PHBH, PVOH, PCL, PHA, PHB, PHBV, cellophane, cellulose, other biodegradable polymers, and mixtures thereof. The layers of the marine-biodegradable material structure may also contain organic and inorganic fillers that can be selected from $CaCO_3$, clay, talc, kaolin, wood fibers, cellulose fibers, starch, other inorganic and/or biodegradable fillers, and mixtures thereof. Some of the layers can also be made of biodegradable substances like paper, cellulose, cellophane, other inorganic or biodegradable materials in the shape of sheet or film, and mixtures thereof.

It will be appreciated that the number of layers and dimensions of each of the layers can be varied depending on the materials selected, the application, and desired product properties and functionality.

In some examples, the composite film can include at least two of the marine-biodegradable layer, and the at least one water-soluble layer can be interspaced between the at least two marine-biodegradable layer. In some examples, the composite film can include a plurality of the water-soluble layer and a plurality of the marine-biodegradable layer, and the water-soluble layers can be interspaced between the marine-biodegradable layers. In some examples, the composite film can include at least ten of the water-soluble layers and at least ten of the marine-biodegradable layers. In some examples, the composite film can include at least one hundred of the water-soluble layers and at least one hundred of the marine-biodegradable layers. Various configurations are possible.

In some examples, the composite film can include between about 1% w/w to about 98% w/w of the at least one water-soluble layer. In some examples, the composite film can include between about 30% w/w to about 70% w/w of the at least one marine-biodegradable layer. In some examples, the composite film can include between about 60% w/w of the at least one water-soluble layer and about 40% w/w of the at least one marine-biodegradable layer.

In some examples, the at least one water-soluble layer and the at least one marine-biodegradable layer can be laminated together to form the composite film. In some examples, the at least one water-soluble layer and the at least one marine-biodegradable layer can be co-extruded to form the composite film.

In some examples, the composite film can have a thickness of between 7 μm and 3 mm. In some examples, the composite film can have a thickness of between 100 μm and 500 μm.

In various examples, composite film structures can contain two distinct layer compositions only, while in other examples, the composite film structures can be made of three or more different layer compositions, as needed to achieve product properties and functionality.

In some examples, the at least one water-soluble layer can include water-soluble substances and water-insoluble substances. In some examples, the water-soluble substance can be selected from thermoplastic starch (TPS), PVOH, copolymers thereof, derivatives thereof, and mixtures thereof. In some examples, the water-insoluble substance can be selected from PHBH, PCL, PHA, PHB, PHBV, cellophane, cellulose, other biodegradable polymers, and mixtures thereof, and from organic and inorganic fillers that can be selected from $CaCO_3$, clay, talc, kaolin, wood fibers, cellulose fibers, starch, other inorganic and/or biodegradable fillers, and mixtures thereof.

In some examples, the at least one marine-biodegradable layer can include at least one marine-biodegradable substance. In some examples, the marine-biodegradable substance can be selected from PHBH, PVOH, PCL, PHA, PHB, PHBV, TPS, cellophane, cellulose, copolymers thereof, derivatives thereof, and mixtures thereof.

In some examples, the at least one marine-biodegradable layer can include at least one compostable substance. In some examples, the compostable substance can be selected from PBA, PBAT, PBS, PBSA, PBT, PHB, PHBH, PDO, PGA, PVOH, PLA, PCL, PLC, PHA, PHV, PHBV, copolymers thereof, derivatives thereof, and mixtures thereof.

In some examples, the composite film can include plurality of the at least one marine-biodegradable layer, and at least one of the marine-biodegradable layer can include a biodegradable substance selected from paper, cellulose, and cellophane, derivatives thereof, and mixtures thereof. In some examples, the biodegradable substance can be in the shape of a sheet and can be formed to be at least one of continuous, woven, spun-bonded and melt-bonded.

In some exemplary experiments, the inventors prepared samples of an ultra-fast marine-biodegradable material structure made with the addition of starch. Since regular starch can be unstable during typical extrusion conditions, and can be characterized by a limited specific area of particles and limited compatibility with certain polymers, a nanostarch compound can be used. The nanostarch compound can include 100 nm nanostarch particles produced via process of mechanical destruction of regular starch, and then capping and partially cross-linking the nanostarch particles using maleic anhydride in a reactive extrusion process, for improved thermal stability and compatibility with other substances used in water-soluble and in water-insoluble marine-biodegradable layers. Additionally, in some examples, methods of nanostarch preparation can include: chemical reaction or mechanical processing (including, for example, ultrasonic, gamma radiation, extrusion); and/or chemical cross-linking or functionalization.

As used herein, the term "nanostarch" refers to starch nanoparticles having a particle size in a range of about 40 to about 500 nm. While the nanostarch can be of a range of sizes, and a combination of sizes can be included in a nanostarch compound, an optimal size can be around 100 nm based on the inventor's experiments.

Table 1 shows the sizes of various typical natural starches.

TABLE 1

Granule Size of Various Starches

| Starch Species | Granule Size Range (μm) (Coulter Counter) | Average size (μm) |
| --- | --- | --- |
| Waxy Rice | 2-13 | 5.5 |
| High Amylose Corn | 4-22 | 9.8 |
| Corn | 5-25 | 14.3 |
| Cassava | 3-28 | 14 |
| Sorghum | 3-27 | 16 |
| Wheat | 3-34 | 6.5, 19.5 |
| Sweet Potato | 4-40 | 18.5 |
| Arrowroot | 9-40 | 23 |
| Sago | 15-50 | 33 |
| Potato | 10-70 | 36 |
| Canna (Aust. Arrowroot) | 22-85 | 53 |

A comparison of these sizes shows that, for example, 100 nm nanostarch compared to 20.8 μm regular starch increases a total specific surface area of starch by an average factor of 208. Exemplary calculations are given in Table 2.

TABLE 2

| | startch | nano-startch |
| --- | --- | --- |
| Largest startch of 85 microns | | |
| size, mic | 85 | 0.1 |
| density, gr/cc | 1.5 | 1.5 |
| particle weight, gr | 9.2119E−07 | 1.5E−15 |
| # of particles per gr | 1085555.33 | 6.6667E+14 |
| particle surface area, cm2 | 0.00090746 | 1.256E−09 |
| specific surface are per 1 gr, cm2 | 985.098039 | 837333.333 |
| relative surface area | 1 | 850 |
| Average size of 12 known types of starch-20.8 microns | | |

TABLE 2-continued

| | startch | nano-startch |
| --- | --- | --- |
| size, mic | 20.8 | 0.1 |
| density, gr/cc | 1.5 | 1.5 |
| particle weight, gr | 1.3498E−08 | 1.5E−15 |
| # of particles per gr | 74083029.9 | 6.6667E+14 |
| particle surface area, cm2 | 5.434E−05 | 1.256E−09 |
| specific surface are per 1 gr, cm2 | 4025.64103 | 837333.333 |
| relative surface area | 1 | 208 |
| Smallest startch of 2 microns | | |
| size, mic | 2 | 0.1 |
| density, gr/cc | 1.5 | 1.5 |
| particle weight, gr | 1.2E−11 | 1.5E−15 |
| # of particles per gr | 8.3333E+10 | 6.6667E+14 |
| particle surface area, cm2 | 5.024E−07 | 1.256E−09 |
| specific surface are per 1 gr, cm2 | 41866.6667 | 837333.333 |
| relative surface area | 1 | 20 |

Due to such an increase in surface area, the rate of initial bacterial insemination and colonization increases drastically. Hence, nanostarch can serve for faster onset of the marine biodegradation process, while regular starch can present feedstock for retaining bacterial colonies.

Furthermore, starch that was added as a filler into marine-biodegradable polymers was shown to absorb water, swell and cause an accelerated mechanical disintegration, and also it was demonstrated to further reduce the mechanical strength of the separate layers in the marine water thus providing increased safety to birds and aquatic animal in a case of entrapment.

Thus, in some examples, nanostarch filler can include three constituents: nanostarch for increasing specific surface area exposed to bacteria to speed up the rate of initial bacterial insemination; small regular starch to provide feedstock for developing bacterial colonies; and large regular starch to provide enough feedstock for long-term development of bacterial colonies.

In some examples, the nanostarch compound can include nanostarch with a particle size of about 40 to about 500 nm. In some examples, the nanostarch compound can include nanostarch with an average particle size of about 100 nm. In some examples, the nanostarch compound can have about 1% w/w to about 50% w/w of the nanostarch. In some examples, the nanostarch compound can include regular starch. In some examples, the nanostarch compound can include small-size regular starch with a particle size of about 2 to about 13 μm. In some examples, the small-size regular starch can include waxy rice starch with an average particle size of about 5.5 μm. In some examples, the nanostarch compound can have about 10% w/w to about 90% w/w of the small-size regular starch. In some examples, the nanostarch compound can include a large-size regular starch with a particle size of about 10 to about 70 μm. In some examples, the large-size regular starch can include potato starch with an average particle size of about 36 μm. In some examples, the nanostarch compound can have about 10% w/w to about 90% w/w of the large-size regular starch.

In some examples, the compounds for water soluble layers and marine-degradable layers can be combined with water-soluble monosaccharides like sucrose, sorbitol, etc., to further speed-up the initial bacterial insemination, and to speed up disintegration of water-insoluble layers. The choice of specific type of monosaccharide and its content, as well as content and ratio of starches in the nanostarch compound, is specific to the type of plastic, extrusion process parameters and end-use product specifications. Nanostarch compound together with monosaccharides can be melt mixed with a matrix of marine-biodegradable plastics like PHBH, PVOH, PCL, PHA, PHB, PHBV, etc., which both serve as a feedstock for bacteria, and speed up water absorption, swelling, disintegration and dissolution. In some examples, the addition levels of starch and monosaccharides can be about 0.5% w/w to about 80% w/w when mixed with marine-biodegradable plastics and yet exhibit satisfactory mechanical properties and very fast marine degradation.

In some examples, the compounds for water soluble layers and marine-degradable layers can include one or more of a monosaccharide, a disaccharide and an oligosaccharide, soluble in water. In some examples, the one or more of a monosaccharide, a disaccharide and an oligosaccharide can be selected from glucose, fructose, sucrose, glycerin, erythritol, threitol, arabitol, xylitol, ribitol, mannitol, sorbit, sorbitol, galactitol, galactose, iditol, volemitol, nonitol, isomalt, maltitol, lactitol, myo-inositol, other compounds, and mixtures thereof. In some examples, the addition levels can be about 3% w/w to about 15% w/w of the one or more of a monosaccharide, a disaccharide and an oligosaccharide. In some examples, the addition levels can be about 5% w/w to about 10% w/w of the one or more of a monosaccharide, a disaccharide and an oligosaccharide.

In some examples, the compounds for water soluble layers and marine-degradable layers can further include a polysaccharide. The polysaccharide can be selected from starch, cellulose, arabinoxylans, chitin, chitosan, pectins, xanthan gum, dextran, welan gum, gellan gum, diutan gum, pullulan, other polysaccharides, thermoplastic preparations thereof, and mixtures thereof. In some examples, the polysaccharides include nanostarch and/or a nanostarch compound, as described herein. In some examples, the addition level can be about 1% w/w to about 80% w/w of the polysaccharide. In some examples, the addition level can be about 20% w/w to about 50% w/w of the polysaccharide. In some examples, the additive can include about 30% w/w of the polysaccharide. In other examples, the addition levels can be about 0% w/w to about 5% w/w of the polysaccharide.

In some examples, the compounds for water soluble layers and marine-degradable layers can further include a surfactant, which is known to accelerate water dissolution. The surfactant can be selected from glycerol monostearate (GMS), glycerol distearate (GDS), sorbitol monostearate (SMS), sorbitol distearate (SDS), polysorbate-20, polysorbate-40, polysorbate-60, polysorbate-80, sodium stearate, 4-(5-dodecyl)benzenesulfonate, docusate (dioctyl sodium sulfosuccinate), alkyl ether phosphates, benzalkaonium chloride (BAC), perfluorooctanesulfonate (PFOS), other surfactants, and mixtures thereof. In some examples, the addition levels can be about 0.5% w/w to about 15% w/w of the surfactant. In some examples, the addition levels can be about 1% w/w to about 10% w/w of the surfactant. In some examples, the addition levels can be about 6% w/w of the surfactant.

In some examples, the compounds for water soluble layers and marine-degradable layers can further include an organic filler. The organic filler can be selected from wood fiber, saw dust, cellulose, rice shells, nut shells, coffee shells, other organic fillers, and mixtures thereof. In some examples, the addition levels can be about 20% w/w to about 80% w/w of the organic filler. In some examples, the addition levels can be about 20% w/w to about 50% w/w of the organic filler. In some examples, the addition levels can be about 30% w/w of the organic filler. In other examples, the addition levels can be about 0% w/w to about 5% w/w of the organic filler.

The inventors further recognize the problem of plastic waste floating in ocean waters and being swallowed by aquatic animals, potentially leading to their death. Since even the fastest-degrading special marine-degradable plastics may stay intact and float for a long time before complete disintegration, some examples of composite film structures can include an inorganic filler, which can reduce cost and help the composite film structure sink in water, due to the increase in the specific density of the composite. In some examples, the addition level of inorganic filler can be as high as 80% w/w.

Thus, in some examples, the compounds for water soluble layers and marine-degradable layers can further include an inorganic filler. The inorganic filler can be selected from calcium carbonate, clay, kaolin, glass fiber, glass beads, talc, wollastonite, iron ore byproducts, other salt and minerals, and mixtures thereof. In some examples, the ultra-fast marine-biodegradable material includes from about 5% w/w to about 80% w/w of the inorganic filler.

In some examples, the composite film can further include at least one of a water-based adhesive and water-soluble adhesive. In some examples, lamination of the composite films can be aided by use of such adhesives. In some examples, the adhesives can be formulated using water-soluble natural polymers from vegetable sources, including dextrins, starches; from protein sources, including casein, blood, fish, soybean, milk albumen; from animal sources including hides, bones; from water-soluble synthetic polymers including polyvinyl alcohol, cellulose ethers, methylcellulose, carboxymethylcellulose, and polyvinylpyrrolidone; and from other water-soluble adhesives.

In some specific examples of the ultra-fast marine-biodegradable composite films, the at least one water-soluble layer can include PVOH and glycerol, and the at least one marine-biodegradable layer can include PHA, $CaCO_3$, nanostarch compound, sucrose, and surfactant. In such an example, a composite film can include: about 48% w/w of PVOH; about 12% w/w of glycerol; about 23% w/w of PHA; about 6% w/w of nanostarch compound; about 6% w/w of $CaCO_3$; about 3% w/w of sucrose; and about 2% w/w of glycerol monostearate.

In some specific examples of the ultra-fast marine-biodegradable composite films, the at least one water-soluble layer can include partially cross-linked PVOH, or higher saponification value PVOH, ensuring slower dissolution in water. For example, PVOH with a saponification value in the range of 82 to 87 can be used, and glycerol, and the at least one marine-biodegradable layer can include PHA and cellulose fibers. In such examples, a composite film can include: about 54% w/w of PVOH; about 6% w/w of glycerol; about 30% w/w of PHA; and about 10% w/w of cellulose fibers.

Methods of preparing the composite films can include preparing pelletized compounds via melt-blending extrusion, mixing additives with the marine-biodegradable polymers and/or the water soluble polymers, and extruding the mixtures with a suitable layer multiplying or co-extrusion equipment to obtain the multilayered ultra-fast marine-biodegradable composite structure. In some examples, the method can include melt-blending the mixtures. In some examples, the method can include extruding and/or extrusion coating and/or laminating the biodegradable plastic materials in the form of a film, sheet or other continuous or discrete products, with films or sheet of marine-biodegradable non-thermoplastic materials, including paper, cellulose, cellophane and other materials.

It is also known that fish and birds can distinguish between stones and food by shape and color, and color can be important to their choice. When plastic is colorful and looks like food, it can be consumed by birds and sea animals. The inventors contemplate the use of colored plastics that look similar to stone, wood or other natural objects. Thus, in some examples, the composite films can include an optional natural filler or/and an optional color component so that the resulting material looks like stone or wood, making it non-attractive to fish, aquatic animals and birds.

Another strategy contemplated by the inventors to protect aquatic animals is to provide written material and colorful labeling on water-soluble substrates, like TPS, special water-soluble paper, PVOH, and the like. For example, biodegradable PVOH film can dissolve in cold water in a few hours. Alternatively, water soluble ink can be used to print directly on a composite film. These and other approaches can be implemented to further reduce the environmental impact of the ultra-fast marine-biodegradable composite films disclosed herein.

The ultra-fast marine-biodegradable composite films of the present disclosure can be used for various applications, including packaging, such as: food packaging in the form of bags and stand-up pouches; drink packaging, such as six-pack rings for holding soft drink and beer cans; slow release fertilizer packaging; disposable plates and cups, etc. Various applications are contemplated.

EXAMPLES

Using materials and structures described herein, examples of ultra-fast marine-biodegradable composite films were made. The following examples are intended to be illustrative but non-limiting.

Example 1

A nine-layer, 150 μm thick composite film was co-extruded with interspaced layers of: marine-biodegradable compound comprising PHA filled with $CaCO_3$, nanostarch compound, glycerol monostearate (GMS), and sucrose; and water-soluble compound comprising PVOH plasticized with glycerol. Overall, the composite film can comprise 60% of water-soluble layers (by weight) and 40% of marine-biodegradable layers (by weight). The film was produced on a blown film line equipped with two extruders, and a single-mandrel, layer multiplying, multi-microlayer die. PHA-based compound pellets were prepared using a two-stage preheating, planetary compounder. The nanostarch compound was prepared via mixing and pre-drying under vacuum in a high speed mixer.

The composite film structure is illustrated in FIG. 1. It should be appreciated that, in some examples, not all layers need to have the same thickness.

Example 2

An eighteen-layer, 300 μm thick composite film was prepared with interspaced layers of marine-biodegradable compound and water-soluble compound. The eighteen-layer composite film can be made by laminating two nine-layer composite films of Example 1 together using a hot roll laminator, equipped with polytetrafluoroethylene (PTFE)-impregnated belts to prevent films from sticking to the hot rollers. In other examples, the eighteen-layer composite film can be made by co-extrusion.

Figure 2:
FIG. 2 is a schematic diagram of two of the composite films of FIG. 1 laminated together.
Figure 5:
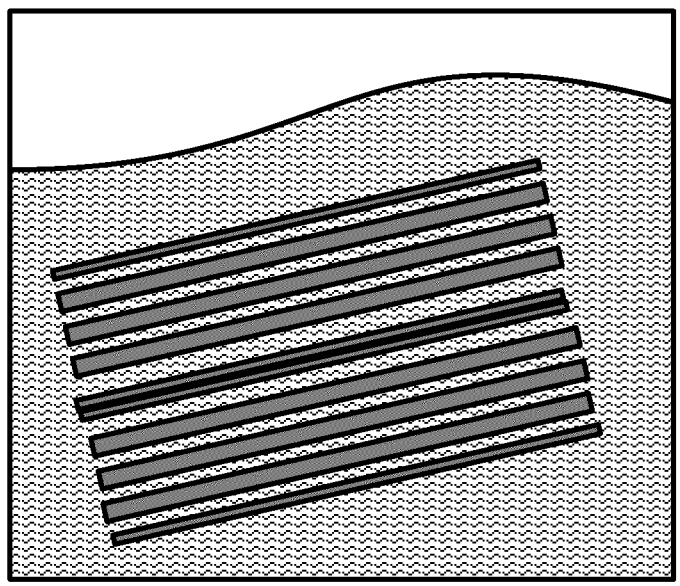
FIG. 5 is a schematic diagram showing the composite film of FIG. 2 in contact with water, in which the water-soluble layers have dissolved allowing the marine-biodegradable layers to be separated.

FIG. 2 illustrates the structure of the eighteen-layer composite film. FIG. 5 shows the behavior of the composite film in water, in which the water-soluble layers dissolved allowing the marine-biodegradable layers to be exposed to water and the composite film to lose mechanical integrity at a faster rate.

After 24 hours of immersion into water, the PVOH-based layers (60% of the weight of the initial eighteen-layer film) dissolved in the water and became edible by bacteria and aquatic animals. The separate layers of PHA-based material were left in the water. The average thickness of each individual PHA layer was 13 μm, which is 4.4% from the initial thickness. Upon contact with water: sucrose starts dissolving, further weakening the PHA material; starch from the nanostarch compound absorbs water, swells, and further weakens the PHA material; and nanostarch from the nanostarch compound partially dissolves in water and further weakens the PHA material.

Since the PHA-based layer further contained 10% w/w of $CaCO_3$ filer and 15% of potato starch, this further reduced the mechanical strength of the separate layers minimizing danger to aquatic animals. Moreover, since PHA, $CaCO_3$ and starch are all heavier than water, the individual PHA films sunk to the bottom of a test water reservoir. The test was conducted by immersion of 25 mm by 50 mm sample strips of the film into 200 ml of fresh and salty room temperature water in 250 ml beakers.

The net result was that, after 24 hours, the individual PHA layers together retain approximately ~1% of the mechanical strength of the original 300 μm film, and stops being a danger to birds and aquatic animals. The relative strength of the film after the water immersion tests was evaluated using laboratory test equipment according to ASTM D-882-75B, Method A.

Example 3

A nine-layer, 150 μm thick composite film was co-extruded with interspaced layers of: marine-biodegradable compound comprising PHA filled with $CaCO_3$, nanostarch compound, glycerol monostearate (GMS), and sucrose; water-soluble compound comprising PVOH plasticized with glycerol; and 20 lb to 40 lb (24×36-500) uncoated, machine-finished paper that provides an optimal substrate for polymer-extrusion coating applications. Overall, the composite film can comprise 60% of water-soluble layers (by weight) and 40% of marine-biodegradable layers (by weight), including paper.

Figure 3:
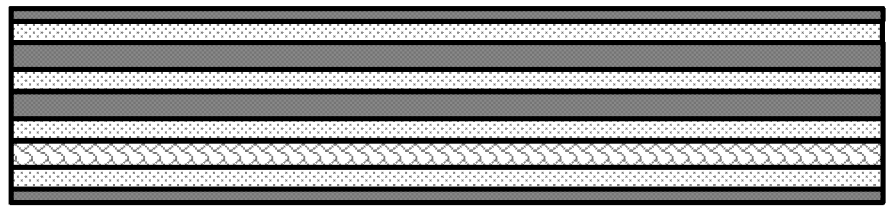
FIG. 3 is a schematic diagram of a composite film including marine-biodegradable layers, water-soluble layers, and a paper layer.

The composite film structure is illustrated in FIG. 3. It should be appreciated that, in some examples, not all layers need to have the same thickness.

Example 4

An eighteen-layer, 300 μm thick composite film was prepared with interspaced layers of marine-biodegradable compound, water-soluble compound and paper. The eighteen-layer composite film can be made by laminating two nine-layer composite films of Example 3 together. In other examples, the eighteen-layer composite film can be made by co-extrusion.

Figure 4:
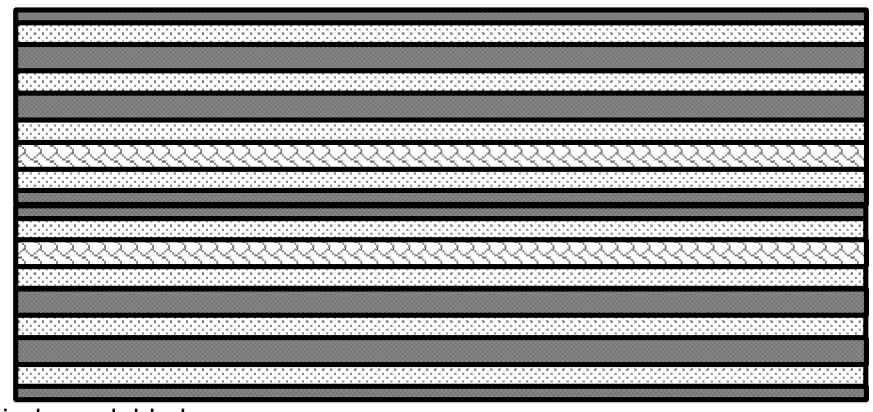
FIG. 4 is a schematic diagram of two of the composite films of FIG. 3 laminated together.
Figure 6:
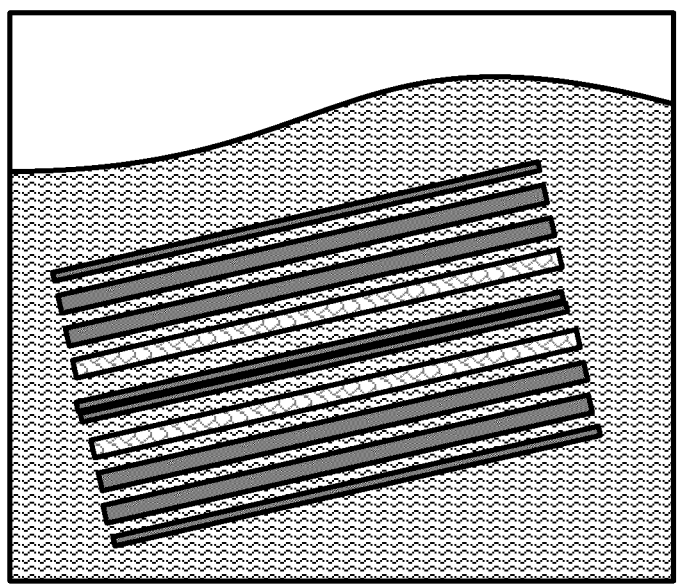
FIG. 6 is a schematic diagram showing the composite film of FIG. 4 in contact with water, in which the water-soluble layers have dissolved allowing the marine-biodegradable and paper layers to be separated.

FIG. 4 illustrates the structure of the eighteen-layer composite film. FIG. 6 shows the behavior of the composite film in water, in which the water-soluble layers dissolved allowing the marine-biodegradable and paper layers to be exposed to water and the composite film to lose mechanical integrity at a faster rate.

After 24 hours of immersion into water, the PVOH-based layers (60% of the weight of the initial eighteen-layer film) dissolved in the water and became edible by bacteria and aquatic animals. The separate layers of PHA-based material and paper were left in the water. The average thickness of each individual PHA layer was 13 μm, which is 4.4% from the initial thickness. The paper layers wet up and falls apart. Upon contact with water: sucrose starts dissolving, further weakening the PHA material; starch from the nanostarch compound absorbs water, swells, and further weakens the PHA material; and nanostarch from the nanostarch compound partially dissolves in water and further weakens the PHA material.

The net result was that, after 24 hours, the individual PHA layers together retain approximately ~1% of the mechanical strength of the original 300 μm film, and stops being a danger to birds and aquatic animals.

While the above description provides examples of one or more apparatuses or methods, it will be appreciated that other apparatuses or methods may be within the scope of the accompanying claims.

We claim:

1. An ultra-fast marine-biodegradable composite film, comprising:
    at least one water-soluble layer; and
    at least one marine-biodegradable layer disposed in contact with the at least one water-soluble layer,
    wherein the at least one water-soluble layer and/or the at least one marine-biodegradable layer comprises a nanostarch compound, and
    wherein the at least one water-soluble layer comprises a water-soluble substance and a water-insoluble substance, and the water soluble substance is selected from thermoplastic starch (TPS), poly(vinyl alcohol) (PVOH), copolymers thereof, derivatives thereof, and mixtures thereof.

2. The composite film of claim 1, comprising a plurality of the water-soluble layer and a plurality of the marine-biodegradable layer, and wherein the water-soluble layers are interspaced between the marine-biodegradable layers.

3. The composite film of claim 2, comprising at least ten of the water-soluble layers and at least ten of the marine-biodegradable layers.

4. The composite film of claim 1, wherein the at least one water-soluble layer and the at least one marine-biodegradable layer are laminated together to form the composite film and/or co-extruded to form the composite film.

5. The composite film of claim 1, wherein the composite film has a thickness of between 7 μm and 3 mm.

6. The composite film of claim 1, wherein the at least one marine-biodegradable layer comprises a marine-biodegradable substance, and the marine-biodegradable substance is selected from polyhydroxy-butylhexanoate (PHBH), PVOH, poly-epsiloncaprolactone (PCL), polyhydroxyalkanoate (PHA), polyhydroxybutyrate (PHB), polyhydroxybutyratevalerate (PHBV), TPS, cellophane, cellulose, copolymers thereof, derivatives thereof, and mixtures thereof.

7. The composite film of claim 1, wherein the at least one marine-biodegradable layer comprises a compostable substance, and the compostable substance is selected from poly(butylene adipate) (PBA), poly(butylene adipate-co-butylene terephthalate) (PBAT), poly(butylene succinate) (PBS), poly(butylene succinate-co-butylene adipate) (PBSA), poly(butylene terephthalate) (PBT), polyhydroxybutyrate (PHB), PHBH, polydioxanone (PDO), poly(glycolic acid) (PGA), PVOH, polylactic acid (PLA), PCL, poly(limonene carbonate) (PLC), PHA, polyhydroxyvalerate (PHV), PHBV, copolymers thereof, derivatives thereof, and mixtures thereof.

8. The composite film of claim 1, wherein the at least one marine-biodegradable layer comprises a biodegradable substance selected from paper, cellulose, and cellophane, derivatives thereof, and mixtures thereof, and the biodegradable substance is in the shape of a sheet and is formed to be at least one of continuous, woven, spun-bonded and melt-bonded.

9. The composite film of claim 1, wherein the nanostarch compound comprises nanostarch with a particle size of about 40 to about 500 nm, and an average particle size of about 100 nm, and the nanostarch compound has about 1% w/w to about 50% w/w of the nanostarch.

10. The composite film of claim 1, wherein the nanostarch compound comprises a small-size regular starch with a particle size of about 2 to about 13 μm, and an average particle size of about 5.5 μm, and the nanostarch compound has about 10% w/w to about 90% w/w of the small-size regular starch.

11. The composite film of claim 1, wherein the nanostarch compound comprises a large-size regular starch with a particle size of about 10 to about 70 μm, and an average particle size of about 36 μm, and the nanostarch compound has about 10% w/w to about 90% w/w of the large-size regular starch.

12. The composite film of claim 1, wherein the at least one water-soluble layer and/or the at least one marine-biodegradable layer comprises one or more of a monosaccharide, a disaccharide and an oligosaccharide, soluble in water, and the one or more of a monosaccharide, a disaccharide and an oligosaccharide is selected from glucose, fructose, sucrose, glycerin, erythritol, threitol, arabitol, xylitol, ribitol, mannitol, sorbit, sorbitol, galactitol, galactose, iditol, volemitol, nonitol, isomalt, maltitol, lactitol, myo-inositol, and mixtures thereof.

13. The composite film of claim 1, wherein the at least one water-soluble layer and/or the at least one marine-biodegradable layer comprises a polysaccharide, and the polysaccharide is selected from starch, cellulose, arabinoxylans, chitin, chitosan, pectins, xanthan gum, dextran, welan gum, gellan gum, diutan gum, and pullulan, thermoplastic preparations thereof, and mixtures thereof.

14. The composite film of claim 1, wherein the at least one water-soluble layer and/or the at least one marine-biodegradable layer comprises a surfactant, and the surfactant is selected from glycerol monostearate (GMS), glycerol distearate (GDS), sorbitol monostearate (SMS), sorbitol distearate (SDS), polysorbate-20, polysorbate-40, polysorbate-60, polysorbate-80, sodium stearate, 4-(5-dodecyl) benzenesulfonate, docusate (dioctyl sodium sulfosuccinate), alkyl ether phosphates, benzalkaonium chloride (BAC), perfluorooctanesulfonate (PFOS), and mixtures thereof.

15. The composite film of claim 1, wherein the at least one water-soluble layer and/or the at least one marine-biodegradable layer comprises an organic filler, and the organic filler is selected from wood fiber, saw dust, cellulose, rice shells, nut shells, coffee shells, and mixtures thereof.

16. The composite film of claim 1, wherein the at least one water-soluble layer and/or the at least one marine-biodegradable layer comprises an inorganic filler, and the inorganic filler is selected from calcium carbonate, clay, kaolin, glass fiber, glass beads, talc, wollastonite, iron ore byproducts, and mixtures thereof.

17. The composite film of claim 1, comprising at least one of a water-based adhesive and a water-soluble adhesive, and the at least one of a water-based adhesive and a water-soluble adhesive is selected from dextrin, starch, casein, blood, fish, soybean, milk albumen, animal hides, bones, PVOH, cellulose ethers, methylcellulose, carboxymethylcellulose, polyvinylpyrrolidone, and mixtures thereof.

18. The composite film of claim 1, wherein the at least one water-soluble layer comprises PVOH and glycerol, and the at least one marine-biodegradable layer comprises PHA, $CaCO_3$, nanostarch compound, sucrose, and surfactant, the composite film comprising:
    about 48% w/w of PVOH;
    about 12% w/w of glycerol;
    about 23% w/w of PHA;
    about 6% w/w of nanostarch compound;
    about 6% w/w of $CaCO_3$;
    about 3% w/w of sucrose; and
    about 2% w/w of glycerol monostearate.

19. The composite film of claim 1, wherein the at least one water-soluble layer comprises PVOH and glycerol, and the at least one marine-biodegradable layer comprises PHA and cellulose fibers, the composite film comprising:
    about 54% w/w of PVOH;
    about 6% w/w of glycerol;
    about 30% w/w of PHA; and
    about 10% w/w of cellulose fibers.

20. An ultra-fast marine-biodegradable composite film, comprising:
    at least one water-soluble layer; and
    at least one marine-biodegradable layer disposed in contact with the at least one water-soluble layer,
    wherein the at least one water-soluble layer and/or the at least one marine-biodegradable layer comprises a nanostarch compound, and
    wherein the at least one marine-biodegradable layer comprises a biodegradable substance selected from paper, cellulose, and cellophane, derivatives thereof, and mixtures thereof, and the biodegradable substance is in the shape of a sheet and is formed to be at least one of continuous, woven, spun-bonded and melt-bonded.

* * * * *